US012008858B1

(12) United States Patent
Matos et al.

(10) Patent No.: US 12,008,858 B1
(45) Date of Patent: Jun. 11, 2024

(54) ELECTRONIC GAMING MACHINE AND METHODS FOR PLAYING A HOLD AND DROP KENO GAME

(71) Applicant: Aristocrat Technologies Australia Pty Limited, North Ryde (AU)

(72) Inventors: Joshua Matos, Cordeau Heights (AU); Marc Mayo, Balgownie (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 17/937,729

(22) Filed: Oct. 3, 2022

Related U.S. Application Data

(63) Continuation of application No. 16/870,550, filed on May 8, 2020, now Pat. No. 11,462,073.

(60) Provisional application No. 62/849,498, filed on May 17, 2019.

(51) Int. Cl.
*G07F 17/32* (2006.01)

(52) U.S. Cl.
CPC ...... *G07F 17/3211* (2013.01); *G07F 17/3286* (2013.01)

(58) Field of Classification Search
CPC .......................... G07F 17/3211; G07F 17/3286
See application file for complete search history.

(56) References Cited

U.S. PATENT DOCUMENTS 6,110,043 A * 8/2000 Olsen ...................... G07F 17/32 463/27
D502,184 S 2/2005 Glezer
7,156,738 B2 1/2007 Rowe
7,156,741 B2 1/2007 Hornik
7,291,066 B2 * 11/2007 Gauselmann ........... G07F 17/32 463/16
D648,344 S 11/2011 Arnold
D698,799 S 2/2014 Edwards
D719,582 S 12/2014 Frew
8,900,057 B2 12/2014 Johnson
9,076,287 B2 7/2015 Hornik
D754,165 S 4/2016 Park
D757,088 S 5/2016 Moriya
(Continued)

OTHER PUBLICATIONS

Office Action dated Apr. 1, 2022 for U.S. Appl. No. 29/735,071 (pp. 1-8).
(Continued)

*Primary Examiner* — Kevin Y Kim
(74) *Attorney, Agent, or Firm* — Armstrong Teasdale LLP

(57) ABSTRACT

An electronic gaming system includes a processor that is configured to display a keno card during a base game. The keno card includes a plurality of player selectable spots, and each spot includes a number. The system receives a player selection of one or more spots. During a random selection of numbered balls, the processor determines whether at least one ball of the plurality of balls includes a feature game trigger. A ball that includes the feature game trigger may be different from other balls produced by the random selection, in that the ball is gold colored (or otherwise visually distinct). If the ball including the feature game trigger matches at least one player selected spot, the processor may mark the player selected spot on the keno card as a matched spot and/or convert the spot to a cash or prize value. A feature game may also be triggered.

18 Claims, 9 Drawing Sheets

(56) References Cited

U.S. PATENT DOCUMENTS

| | | | |
|---|---|---|---|
| D760,288 S | 6/2016 | Kendler | |
| 9,406,191 B2 | 8/2016 | Hornik | |
| D787,543 S | 5/2017 | Qiu | |
| D789,397 S | 6/2017 | Lee | |
| D815,128 S | 4/2018 | Phillips | |
| D820,868 S | 6/2018 | Lee | |
| D841,041 S | 2/2019 | Ng | |
| D849,765 S | 5/2019 | Lee | |
| D886,831 S | 6/2020 | Yang | |
| D890,198 S | 7/2020 | Paul | |
| D900,130 S | 10/2020 | Matos | |
| D918,237 S | 5/2021 | Lee | |
| D918,241 S | 5/2021 | Sheridan | |
| D921,689 S | 6/2021 | Devine | |
| D926,784 S | 8/2021 | Carlson | |
| 11,183,018 B2 | 11/2021 | Marks | |
| D939,564 S | 12/2021 | Kwak | |
| 11,257,321 B2 | 2/2022 | Penacho | |
| 11,257,323 B2 | 2/2022 | Olive | |
| D944,849 S | 3/2022 | Kwak | |
| 2003/0104865 A1 | 6/2003 | Itkis | |
| 2003/0211879 A1 | 11/2003 | Englman | |
| 2005/0143165 A1 | 6/2005 | Berman | |
| 2008/0268935 A1* | 10/2008 | Acres | G07F 17/42 463/16 |
| 2009/0124389 A1 | 5/2009 | Nelson | |
| 2010/0029381 A1 | 2/2010 | Vancura | |
| 2012/0220356 A1 | 8/2012 | Gilbertson | |
| 2012/0303548 A1 | 11/2012 | Johnson | |
| 2015/0065222 A1 | 3/2015 | Lovaas | |
| 2019/0102968 A1 | 4/2019 | Ludwick | |

OTHER PUBLICATIONS

Office Action (Non-Final Rejection) dated Nov. 4, 2021 for U.S. Appl. No. 16870550 (pp. 1-12).
Office Action (Final Rejection) dated Mar. 7, 2022 for U.S. Appl. No. 16870550 (pp. 1-6).
Office Action (Notice of Allowance and Fees Due (PTOL-85)) dated Jun. 2, 2022 for U.S. Appl. No. 16/870,550 (pp. 1-9).
Notice of Allowance dated Jul. 26, 2022 for U.S. Appl. No. 29/735,071 (pp. 1-7).

* cited by examiner

ELECTRONIC GAMING MACHINE AND METHODS FOR PLAYING A HOLD AND DROP KENO GAME

CROSS-REFERENCE TO RELATED APPLICATIONS

This application is a continuation of and claims priority to U.S. patent application Ser. No. 16/870,550, filed May 8, 2020, which claims priority to U.S. Provisional Patent Application No. 62/849,498, filed May 17, 2019, which are hereby incorporated by reference in their entireties.

TECHNICAL FIELD

The field of disclosure relates generally to electronic gaming, and more particularly, to a hold and drop keno game in which one or more player selected spots are matched based upon a plurality of balls selected during the keno game, and if any of the balls used to match a spot includes a feature game trigger, a feature keno game is triggered during which the matched player selected spots are held for the feature keno game during a plurality of re-drops.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In addition, keno games traditionally include a numbered keno card, which a player marks to indicate a selection of one or more numbers on the card. A random selection of one or more numbered balls is next conducted, after which the player may receive a prize according to a number of matches achieved between the numbers selected on the keno card and the numbers appearing on the randomly selected balls. Traditional keno games do not, however, include a bonus or feature game, nor is there any mechanism for carrying matched spots from the base game into subsequent (e.g., feature) games.

SUMMARY

In one aspect, an electronic gaming system is described. The system includes a memory and a processor configured to execute instructions stored in the memory. When executed, the instructions cause the processor to at least control a display device to display a keno card during a base game, the keno card including a plurality of selectable spots, each spot including a number. The instructions also cause the processor to receive a selection of one or more spots of the plurality of selectable spots, and randomly select, based upon at least one random number received from a random number generator (RNG), a plurality of balls, each ball of the plurality of balls including a number. Further, the instructions cause the processor to control the display device to mark spots selected on the keno card corresponding to the plurality of balls, determine whether a predetermined quantity of selected spots match with a subset of the plurality of balls, the subset being feature trigger balls, and in response to determining that the predetermined quantity of selected spots match with the subset of the plurality of balls, control the display device to display a feature keno game including a plurality of re-drops. During each of the plurality of re-drops of the feature keno game, the instructions may also cause the processor to at least randomly select, based upon at least one random number received from the RNG, a new plurality of balls, determine whether the new plurality of balls includes feature trigger balls, and in response to determining that the new plurality of balls includes feature trigger balls, control the display device to display spots on the keno card corresponding to the feature trigger balls in the new plurality of balls as marked and retain the marks for any remaining re-drops of the feature keno game.

BRIEF DESCRIPTION OF THE DRAWINGS

An example embodiment of the subject matter disclosed will now be described with reference to the accompanying drawings.

DETAILED DESCRIPTION

A hold and drop keno game is described. During the hold and drop keno game, a player selects one or more spots from a keno card, and a ball selection is initiated. If any of the balls in the ball selection include a number that matches a number of a player selected spot, the spot is marked as a match on the keno card. Further, if any of the balls matching a spot include a feature game trigger (e.g., if any matching balls are gold colored), a feature keno game is initiated.

During the feature keno game, the player selected spot (or spots) that were initially matched are held or retained, and one or more new groups of balls are dropped to give the player new chances to match his or her remaining spots. Further, if there are matches during the feature game, the player may be awarded one or more additional drops (or re-drops), which may add to the player's chances of matching a greater number of his or her remaining spots on the keno card. In some embodiments, and as used herein, player selected spots may be "held," inasmuch as balls are held or positioned over matched spots. Similarly, in at least some embodiments, player selected spots may be referred to as being "held," in that player selected spots that are also matched to a ball are retained for one or more subsequent ball selections (e.g., re-drops).

Figure 1:
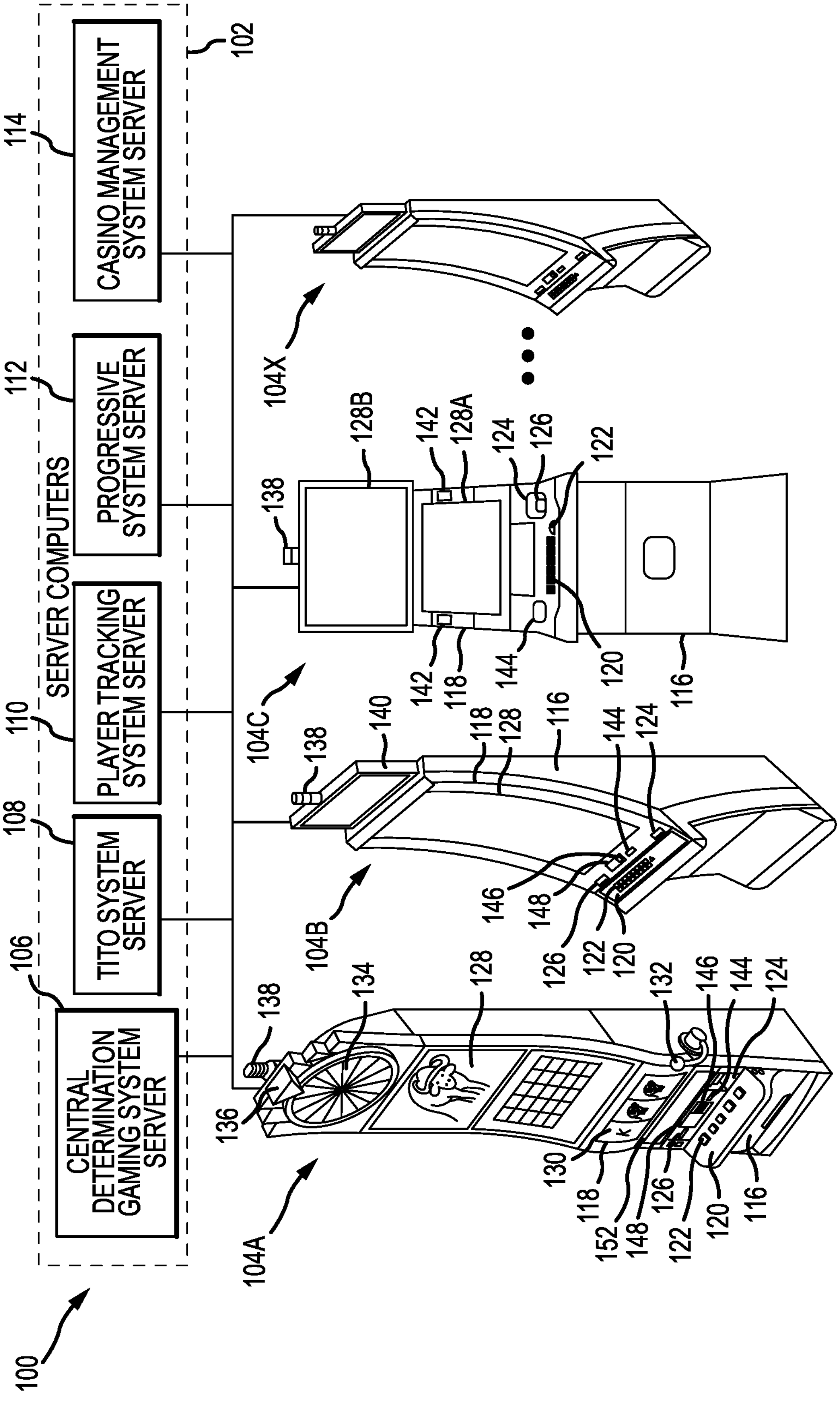
FIG. 1 is an exemplary diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance.

In addition, there can be additional meters that record the total amount of money wagered on the gaming device, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
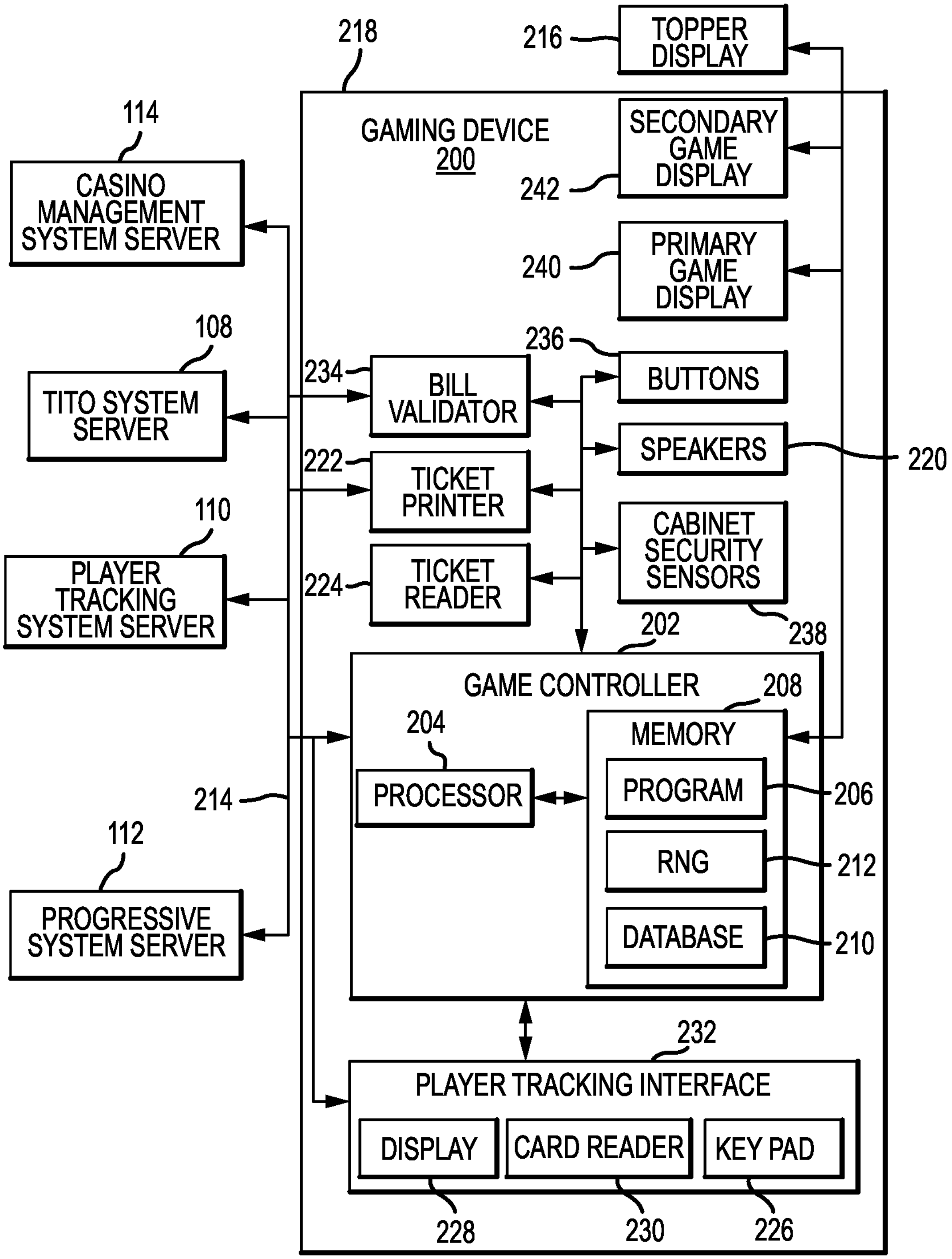
FIG. 2 is a block diagram showing various functional elements of an exemplary EGM.

Many or all the above described components can be controlled by circuitry (e.g., a game controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208. Note that embodiments of the present disclosure represent an improvement in the art of EGM software and provide new technology in that they facilitate a "hold and drop" keno game, in which matched spots are held. At least one technical improvement embodied by the present keno game is that the keno game drives player interest and excitement, which in turn, drives player participation and revenue to the purveyor of the keno game. Another technical improvement is to the keno game itself, which is capable of holding one or more matched spots during subsequent ball selections during the keno game. As a result, a player of the present keno game is permitted to retain matched spots for subsequent ball selections. These embodiments are thus not merely new game rules or simply a new display pattern, but technical changes to a game mechanic itself, accompanied, in turn, by a variety of technical improvements.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2 illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrate specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that outputs credits from and/or loads credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
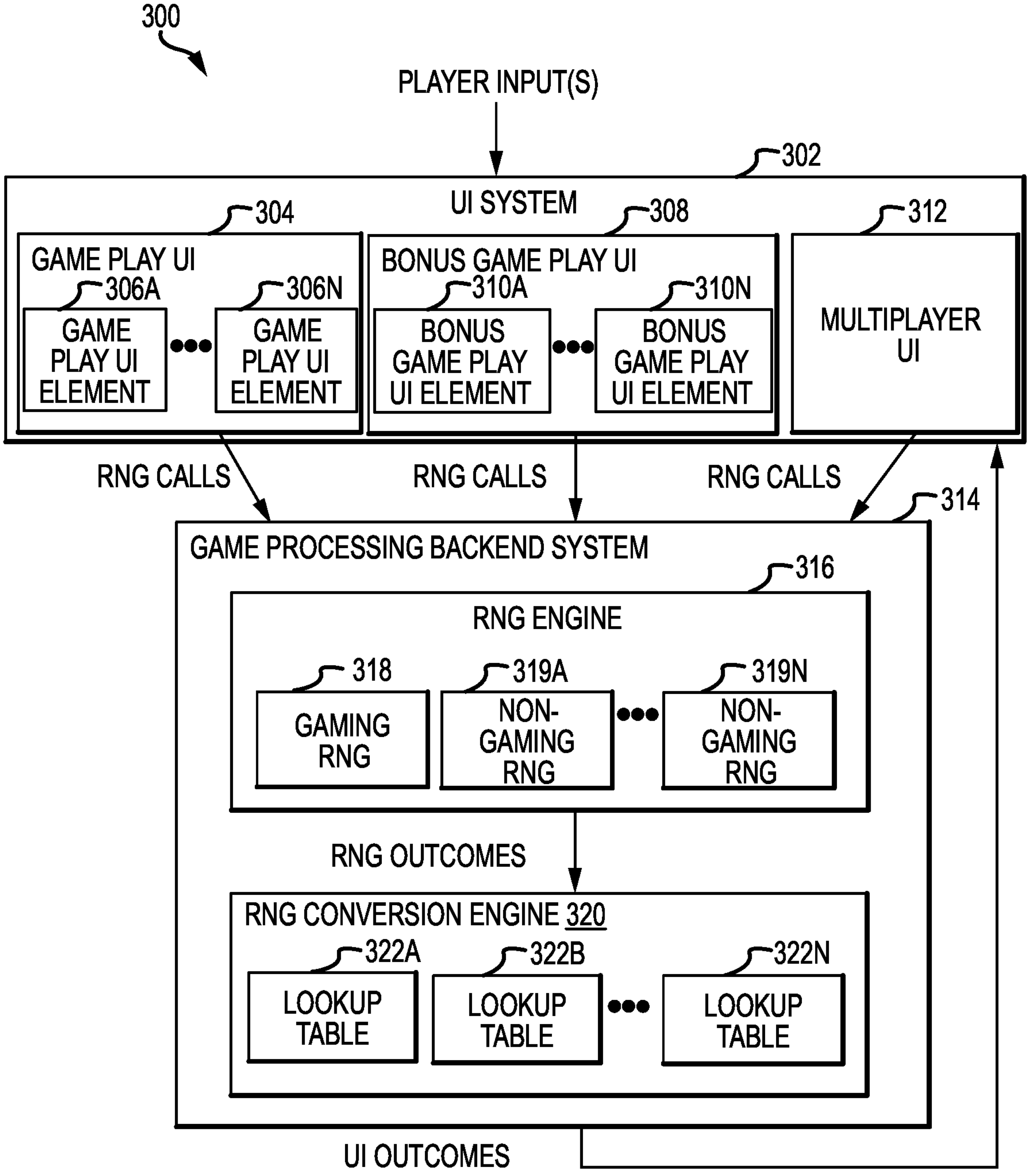
FIG. 3 illustrates, in block diagram form, an embodiment of a game processing architecture algorithm that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computationally less expensive. Non-gaming RNGS 319A-319N can, thus, be used to generate outcomes for non-gaming purposes. As an example, non-gaming RNGs 319A-319N can generate random numbers for such as generating random messages that appear on the gaming device.

The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-

306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline Keno is a lottery-style game in which a player selects one or more numbers (or "spots") from a keno card that includes a plurality of numbers (e.g., numbers one through eighty), and in which a plurality of balls are selected (or "dropped") to determine which of the player selected spots are matched by the ball selection. At the beginning of a keno game, a player may select any of the plurality of numbers shown on the keno card (one through eighty) up to a specified maximum number of spots (e.g., ten spots).

In addition, the player may select or specify a wager. For example, a player may specify a wager in the range of one to twenty dollars. In some keno games, a player may also select a number of keno games, where each keno game corresponds to an independent (randomly determined) ball selection. For example, a player may indicate that a wager of one dollar should be applied to ten keno games, and that each keno game should be evaluated using the player selected spots. Thus, if the player selects spots one through five, wagers one dollar, and indicates a total of ten keno games, the player's total wager would be ten dollars, and each keno game would be evaluated, as described below, against spots one through five.

After a player has selected one or more spots on his or her keno card and placed a wager, a ball selection (or "ball drop") may be initiated, during which a plurality of numbered balls may be "dropped" or selected. Traditionally, physical balls are dropped from a keno ball machine that shuffles and deposits (or "drops") a plurality of balls into a catchment area, where each of the balls dropped into the catchment area are evaluated against the player's keno card to determine a prize. More recently, virtual or video keno games simply simulate a traditional ball selection using an RNG to select balls without replacement. Accordingly, as used herein, the terms "ball selection" and "ball drop" are used interchangeably to refer to selection of a plurality of balls during a base and/or feature keno game.

In either instance, each ball selected during a ball selection includes a number corresponding to one of the plurality of numbers on the keno card (again, one through eighty). In a conventional keno game, different numbers of balls may be dropped in response to a player selection of one or more spots and a player wager. Irrespective of the number of balls selected, the outcome is that each of the spots (player selected or not) on the keno card matches one of the balls selected during the ball selection.

To determine a player award, the number of player selected spots matching balls selected during the ball drop are determined (e.g., counted), and a prize corresponding to the number of matches is provided to the player. For example, a paytable may indicate that one matched spot corresponds to no prize, two matched spots corresponds to a first prize, three matched spots corresponds to a second prize, and so on.

Traditionally, keno games are simply played from one ball selection to the next and do not include any sort of feature game. For example, player selected spots are simply evaluated against a plurality of successive ball selections. After each ball selection and keno card evaluation, any matches on the player's keno card are reset or removed, and the player selected spots are re-matched and reevaluated against each successive ball selection anew. Likewise, a player may select a plurality of new or different spots prior to a next consecutive ball selection (or the same spots, depending upon player preference). Whatever the case, conventional keno games do not include any sort of mechanism or game mechanic for holding a matched spot or spots from one ball selection to the next. Accordingly, players may feel as though any progress they have made during a previous ball selection and keno card evaluation is lost from one keno game to the next (or one ball selection to the next).

Figure 4:
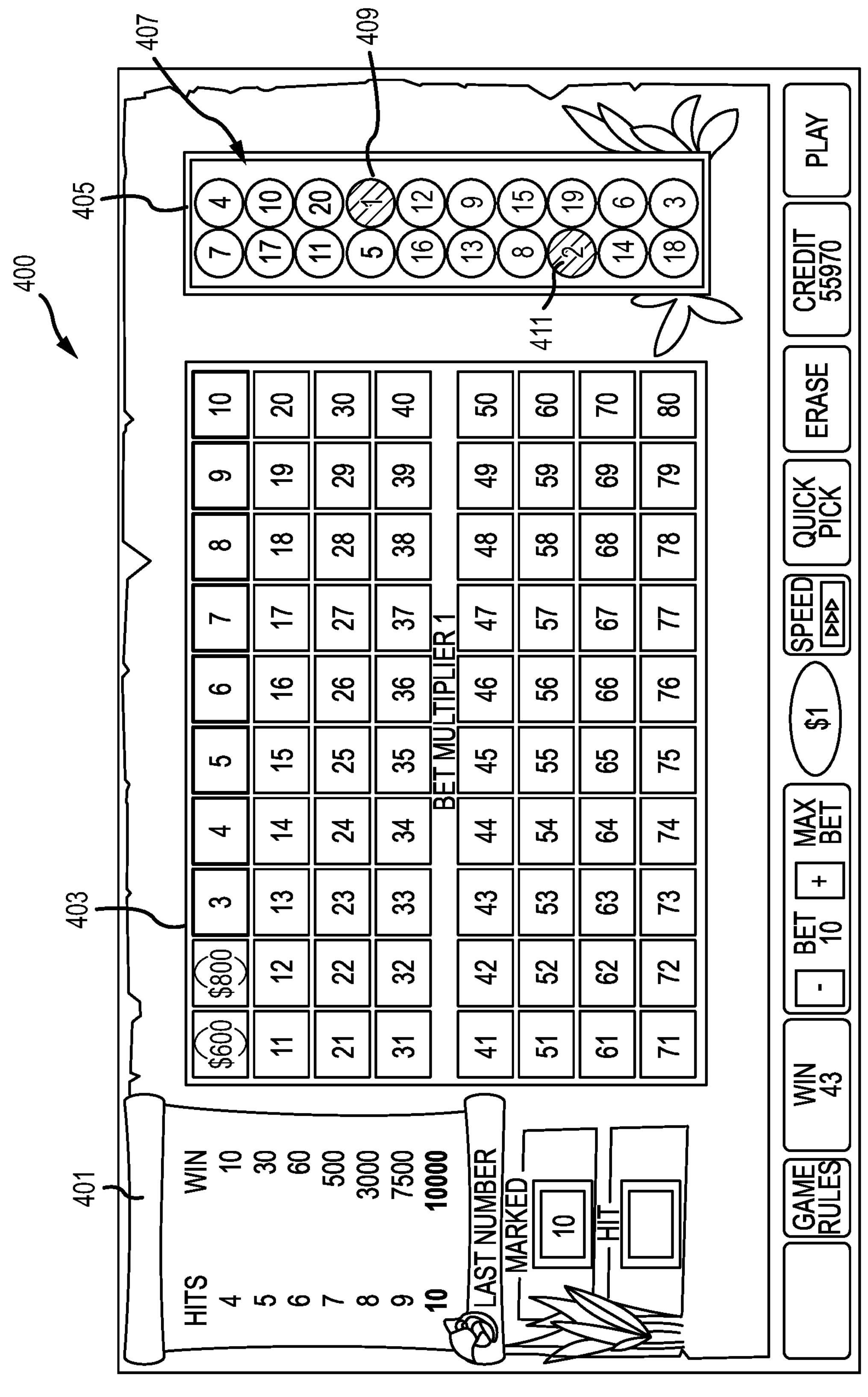
FIG. 4 is a screenshot of an example base keno game, in which a player selects a desired number of spots, and in which a feature keno game is triggered from the base keno game based upon a ball selection occurring in the base keno game.

FIG. 4 is a screenshot of an example base keno game 400, in which a player selects a desired number of spots, and in which a feature keno game is triggered from the base keno game 400 based upon a ball selection occurring in the base keno game 400. In the example embodiment, base keno game 400 is shown on a display of an EGM 104A-104X, such as primary game display 240. In addition, a paytable 401 is shown on the left-hand side of the display 240, a keno card 403 is shown in a center portion of the display 240, and a ball selection area 405 is shown on a right side of the display 240.

Although keno games 400 and 500 are primarily described herein as being executed and/or displayed on an EGM 104A-104X, in some embodiments, base keno game 400 and feature keno game 500 can also be provided to any other end-user computing device ("EUD"), such as, for example, any suitable tablet or personal computing device of the player, any smartphone of the player, and the like. Further, in these embodiments, a server (e.g., any of servers 106-114 and/or another mobile computing server) may provide games 400 and 500 to the player's EUD, and/or a processor of the player's EUD may also facilitate and process at least some aspects of gameplay.

During play of base keno game 400, the player selects a plurality of spots from keno card 403. Specifically, the player selects up to ten spots from spots one through eighty on keno card 403. In the example of FIG. 300, the player has selected spots one through ten (e.g., spots "1," "2," "3," "4," "5," "6," "7," "8," "9," "10"). However, it will be appreciated that the player may select greater or fewer spots, and that the player may select any of spots one through eighty. Game controller 202 may provide a visual indication of the player selected spots as well. For example, as shown, game controller 202 may controller display 240 to darken or highlight the plurality of player selected spots. In various embodiments, the game may provide a quick pick functionality in which case, the game will select a predetermined number of spots for the player, using a random selection process.

In response to player selection of the plurality of spots, game controller 202 may initiate a ball selection. During the base keno game 400, the ball selection may include twenty balls 407. However, it will be appreciated that any suitable number of balls may be selected (e.g., greater or fewer than twenty). Balls 407 may be randomly selected, such as based upon a random number received by game controller 202 from RNG 212. In the example of FIG. 4, balls numbering one through twenty are selected during the ball selection. However, it will be appreciated that any of balls numbering one through eighty may be randomly selected, as well as that typical ball selections include balls scattered randomly through the range of available numbers. In various embodiments, a random selection process without replacement is used to determine the balls selected. For example, RNG 212 is used to determine the first ball (from a range of 1 to 80). After the first ball is determined, RNG 212 is used to determine the second ball (from a range of 1 to 80, excluding the first ball). RNG 212 is then used to determine the third ball (from a range of 1 to 80, excluding the first and second balls), and so on.

In addition, in at least some embodiments, balls that are included in a ball selection may be colored or otherwise associated with a color. For example, some balls may be blue or gray in color, while others may be gold colored. As described herein, a specified color, such as gold, may be used to indicate that a ball is associated with a feature game trigger. Moreover, ball colors may be randomly determined, such as based upon a number provided by RNG 212. For example, as described herein, if a ball is randomly determined to include a feature game trigger, the ball may also be associated with a gold color. Similarly, if a ball is randomly selected to be dropped but not associated with a feature game trigger, the ball may be blue or gray colored. In certain embodiments, the balls that are associated with a feature game trigger may be determined prior to ball selection for the play of the base game. In certain embodiments, this may be determined as each ball is being randomly determined. For example, once a ball is randomly determined for the ball selection, a second random determination may occur to determine whether the selected ball is also a feature trigger ball. This second random determination may be weighed based on a desired probability of occurrence of the feature game, e.g., having a 1/5 probability of being a feature trigger ball.

After the ball selection is complete, game controller 202 evaluates the player selected spots against the balls included in the ball selection to determine a number of matches. In the example of FIG. 4, the player selected spots numbering one through ten, and balls numbering one through twenty were randomly selected during the ball selection. As a result, the player in the example of FIG. 4 has achieved (or "hit") ten matches. As shown in paytable 401, ten matches corresponds to an award of 10,000 credits. Here again, however, it will be appreciated that these values are merely exemplary and intended to illustrate gameplay.

During play of base keno game 400, a feature keno game 500 may be triggered from base keno game 400. Specifically, if one or more of the balls selected for the ball selection include a designated feature game trigger, and these balls match player selected spots on keno card 403, the feature keno game 500 may be triggered. In the example embodiment, a feature game trigger may include a ball of a specified color, such as gold. If at least one ball in the ball selection includes the feature game trigger (e.g., if at least one dropped ball is gold colored), and the at least one ball matches a player selected spot, feature keno game 500 may be triggered.

In other embodiments, feature keno game 500 may not be triggered unless greater than one ball including feature game trigger is dropped and matches greater than one player selected spot. For example, in at least one embodiment, feature keno game 500 may be triggered in response to two or greater gold balls being dropped in ball selection area 405 and matching two or greater player selected spots. In the illustrated embodiment, balls 409 and 411 (numbered "1" and "2") include the feature game trigger and are gold colored. In addition, because the player selected spots 1-10 (including spots "1" and "2" on keno card 403) for play during the base keno game 400, feature keno game 500 may be triggered.

In some embodiments, each player spot that is matched on keno card 403 may be converted to a cash, credit, or another prize value. Similarly in at least some embodiments, any spot that is matched to a ball including a feature game trigger may be converted to a cash, credit, or prize value (whereas spots that are matched to a ball that does not include a feature game trigger may not be converted to such values).

For example, as shown with reference to the example of FIG. 4, the spots on keno card 403 corresponding to player selected spots "1" and "2" may be converted to cash or credit values. In some embodiments, each cash or credit value may be randomly selected, such as from a weighted paytable. Further, at the conclusion of base keno game 400 and/or feature keno game 500, the cash or credit values appearing on keno card 403 may be aggregated (e.g., added up) and awarded to the player. This may be performed in addition to the credit award provided to the player based upon paytable 401 (as described above) and/or in replacement thereof. However, in other embodiments, and as described in greater detail below, only the base game award from paytable 401 may be provided to the player during base keno game 400, while cash or credit values converted during the base keno game 400 may not be instantly awarded to the player but carried into feature keno game 500. One technical improvement resulting from this game mechanic is that the player may feel that his or her gains during base keno game 400 are carried forward into feature keno game 500 and retained for the upbuilding of growing or increasing final feature game award.

Figure 5:
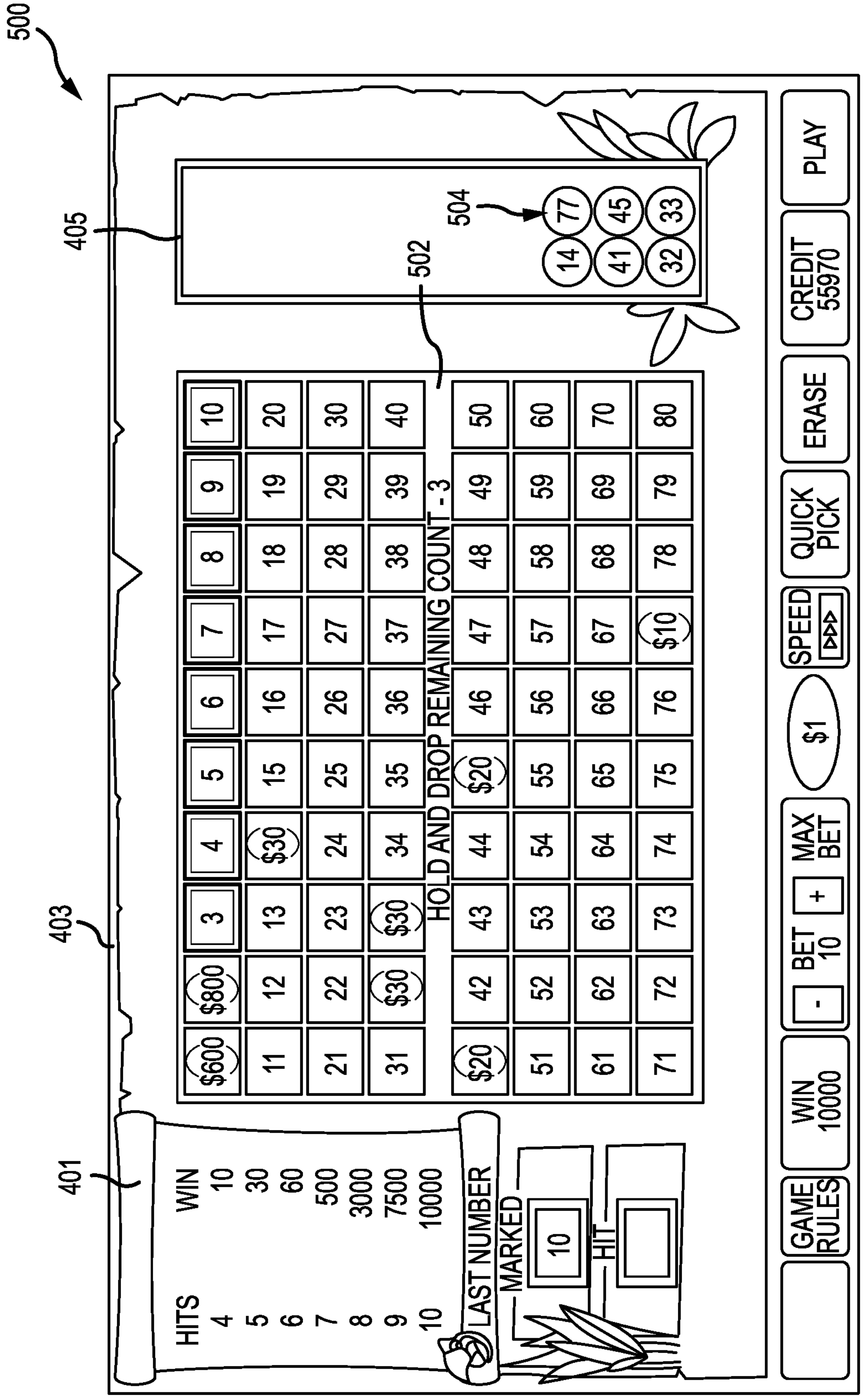
FIG. 5 is a first screenshot of an example feature keno game triggered from the base keno game shown in FIG. 4.

FIG. 5 is a first screenshot of an example feature keno game 500 triggered from base keno game 400 shown in FIG. 4. During feature keno game 500, the player does not, in at least one embodiment, select a new or different number of spots from keno card 403. Rather, the player selected spots from base keno game 400 are retained during feature keno game 500. Likewise, the spots matched to gold balls that were converted to cash values (e.g., spots "1" and "2") from base keno game 400 are also retained during feature keno game 500.

In other words, as shown in the example of FIG. 5, at least the spots on keno card 403 that are matched to gold balls during base keno game 400 are "held" and continue to appear as matches and/or values converted to cash or credit on keno card 403 during feature game 500. In some embodiments, even matches that were not converted to cash or credit values during base keno game 400 are carried forward into feature keno game 500; however, as described herein, during feature keno game, the player may attempt to match non-converted spots from the base keno game 400 to gold balls. In other embodiments, the player may select a plurality of new spots, and/or keep the matched spots.

As a result, during feature keno game 500, one technical improvement exists, in that the player may not feel that he or she has lost one or more previously matched spots. On the contrary, player satisfaction may be improved, inasmuch as the game mechanics described herein accord players an opportunity to "save" otherwise preserve, game progress from base keno game 400 into feature keno game 500. As a result, player satisfaction is improved, in that players are allowed to make continuing progress towards additional or increased game awards.

In addition, during feature keno game 500, the player may be awarded one or more re-drops, which may, as described herein, be used to initiate one or more new ball selections different from the ball selection in base keno game 400. In FIG. 5, a number of re-drops provided and/or remaining are shown within keno card 403 at a "Hold and Drop Remaining Count" indicator 502. In various embodiments, a player may be awarded any number of re-drops at the initiation of feature keno game 500, such as, for example three re-drops.

However, it will be appreciated that any suitable number of re-drops may be provided to the player, which may be pre-determined, randomly determined, based on wager amount, based on number of matched spots, or any other suitable parameter, etc.

Accordingly, during feature keno game 500, the number of re-drops is decremented by one (e.g., from three re-drops to two re-drops), and a new plurality of balls 504 are randomly selected and dropped into ball selection area 405. In the example embodiment, the number of balls selected during feature keno game 500 may be less or more than the number of balls selected during base keno game 400. For example, in at least one embodiment, six balls are randomly selected during any drop or re-drop of feature keno game 500. However, it will be appreciated that any suitable number of balls may be selected during feature keno game 500, which may be pre-determined, randomly determined, based on wager amount, based on number of matched spots, or any other suitable parameter, etc.

In addition, in some embodiments, the balls selected during a re-drop may be reduced by the number of balls from base keno game 400 that include the feature game trigger. For example, if a re-drop includes six balls, and two balls from base keno game 400 (or a previous re-drop, as described herein) include the feature game trigger (e.g., if two balls are gold balls), the two gold balls may be retained, and only four new balls selected for the re-drop. In other embodiments, all six balls forming a re-dropped group of balls may be newly selected, even if there were gold balls in a previous selection.

Similarly, in some embodiments, the balls selected during a re-drop may not include balls already selected and matched to a spot on keno card 403. For example, if balls 409 and 411 (numbered "1" and "2") are previously selected and matched to keno card 403 during a ball selection, these balls 409 and 411 may be excluded from subsequent ball selections. As a result, the pool of available balls may be reduced during one or more subsequent re-drops (depending, for example, upon previous matches), and the odds of achieving matches during subsequent drops may therefore improve as spots are matched on keno card 403. Stated another way, in various embodiments, a new plurality of balls may be randomly selected for use during the feature game from the same pool of balls, less the at least one ball that was previously matched.

In addition, in the example embodiment, each ball selected and dropped during feature keno game 500 may include the feature game trigger, as described above. For instance, in at least one embodiment, each ball selected during feature keno game 500 may be a "gold" ball. In other embodiments, however, fewer than all of the balls selected during feature game 500 may include the feature game trigger, or the feature game trigger may be excluded during feature game 500.

In response to the ball selection (and drop or re-drop) during feature keno game 500, game controller 202 may, as described above, evaluate the balls selected during feature keno game 500 against the player selected spots. Here as well, if any of the balls selected during feature keno game 500 match a player selected spot, the spot may be marked or otherwise indicated (e.g., highlighted, daubed, darkened, etc.) on keno card 403 to indicate the match. Likewise, in at least some embodiments, each matched spot may be converted to a randomly selected cash, credit, or prize value, and the value may be displayed over or within the matched spot on keno card 403. Further, as described above, in at least some embodiments, any spot that is matched to a ball including a feature game trigger may be converted to a cash, credit, or prize value (whereas spots that are matched to a ball that does not include a feature game trigger may not be converted to such values).

In addition to decrementing the number of re-drops, as described above, the number of re-drops may also be incremented during feature keno game 500. For example, in at least one embodiment, the number of re-drops may be incremented in response to one or more matches of a ball selected during feature keno game 500 and a player selected spot. In some embodiments, the number of re-drops is incremented back to a starting value (e.g., three). In other embodiments, the number of re-drops may be incremented by a number, such as one, which may be pre-determined, randomly determined, based on wager amount, based on number of matched spots, or any other suitable parameter, etc. In the example of FIG. 5, none of the balls dropped into ball selection area 405 match a player selected spot on keno card 403. As a result, the number of re-drops is not incremented, but decremented by one (e.g., from three re-drops to two re-drops).

Figure 6:
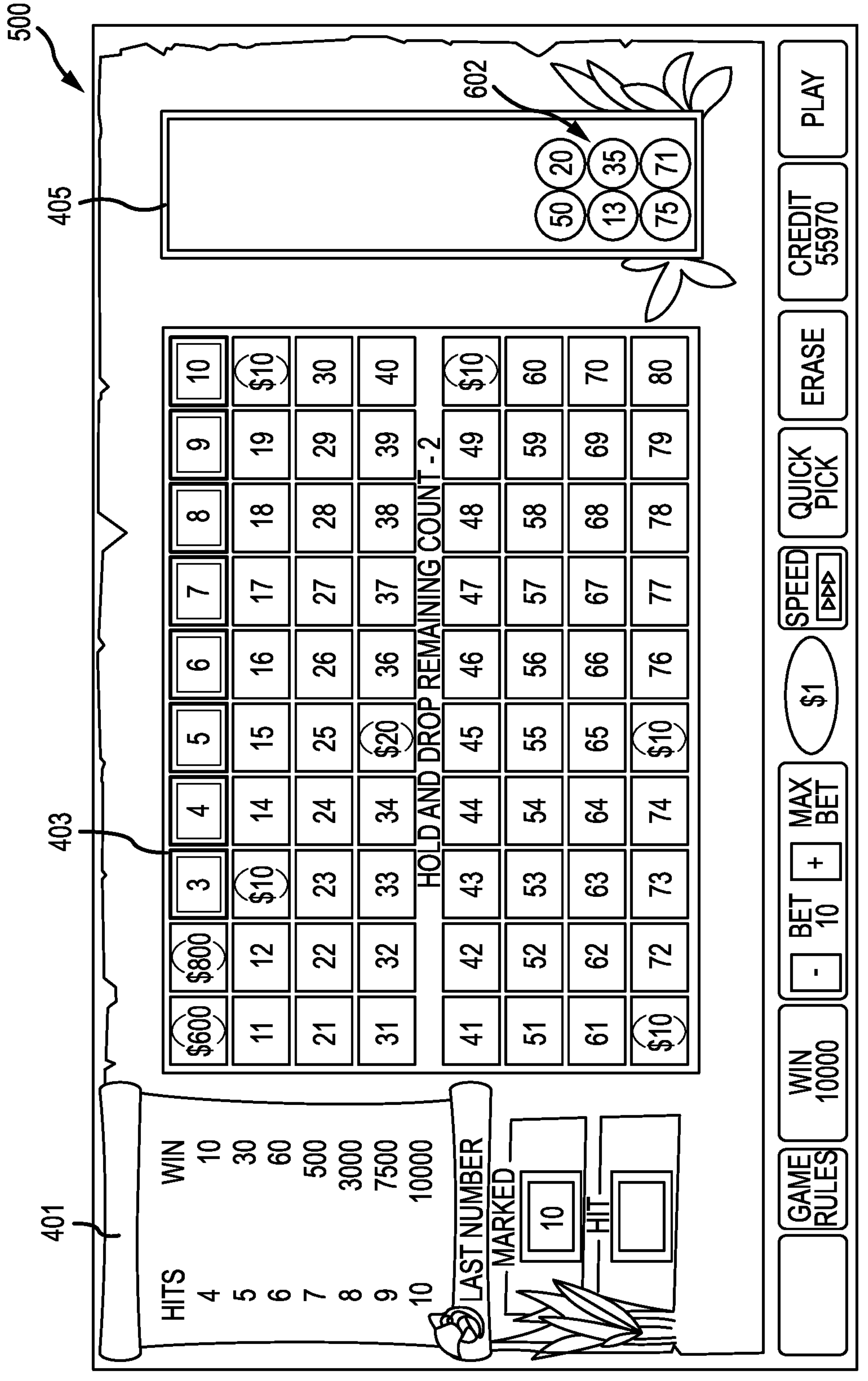
FIG. 6 is a second screenshot of the example feature keno game triggered from the base know game shown in FIG. 4.

FIG. 6 is a second screenshot of feature keno game 500 showing a next ball selection in the sequence of re-drops. In the example embodiment, six new balls 602 are randomly selected and dropped into ball selection area 405. Here again, each new ball includes the feature game indicator (e.g., each ball is gold colored); however, as described above, fewer than all of the balls selected may be gold, or none of the balls may be gold colored.

Further, as described above, game controller 202 compares the numbers associated with each newly dropped (or re-dropped) ball within ball selection area 405 and compares the number of each ball to the numbers associated with each player selected spot. If there are any matches, these are marked on keno card 403, and the number of re-drops remaining is either incremented or decremented. For example, if there are matches between player selected spots and balls selected, game controller 202 may increment the number of re-drops, such as by one re-drop, by two re-drops, and/or any other suitable number of drops.

In some embodiments, if a match occurs during feature bonus game 500, game controller 202 may increment the number of re-drops to a starting value (e.g., three), and gameplay may continue in this fashion until the player exhausts all of his or her re-drops or until all of the player selected spots are matched by balls selected during base keno game 400 and feature keno game 500. In the example of FIG. 6, none of the balls selected and dropped into ball selection area 405 match a player selected spot on keno card 403. As a result, the number of re-drops is not incremented, but decremented by one (e.g., from two re-drops to one re-drop).

Figure 7:
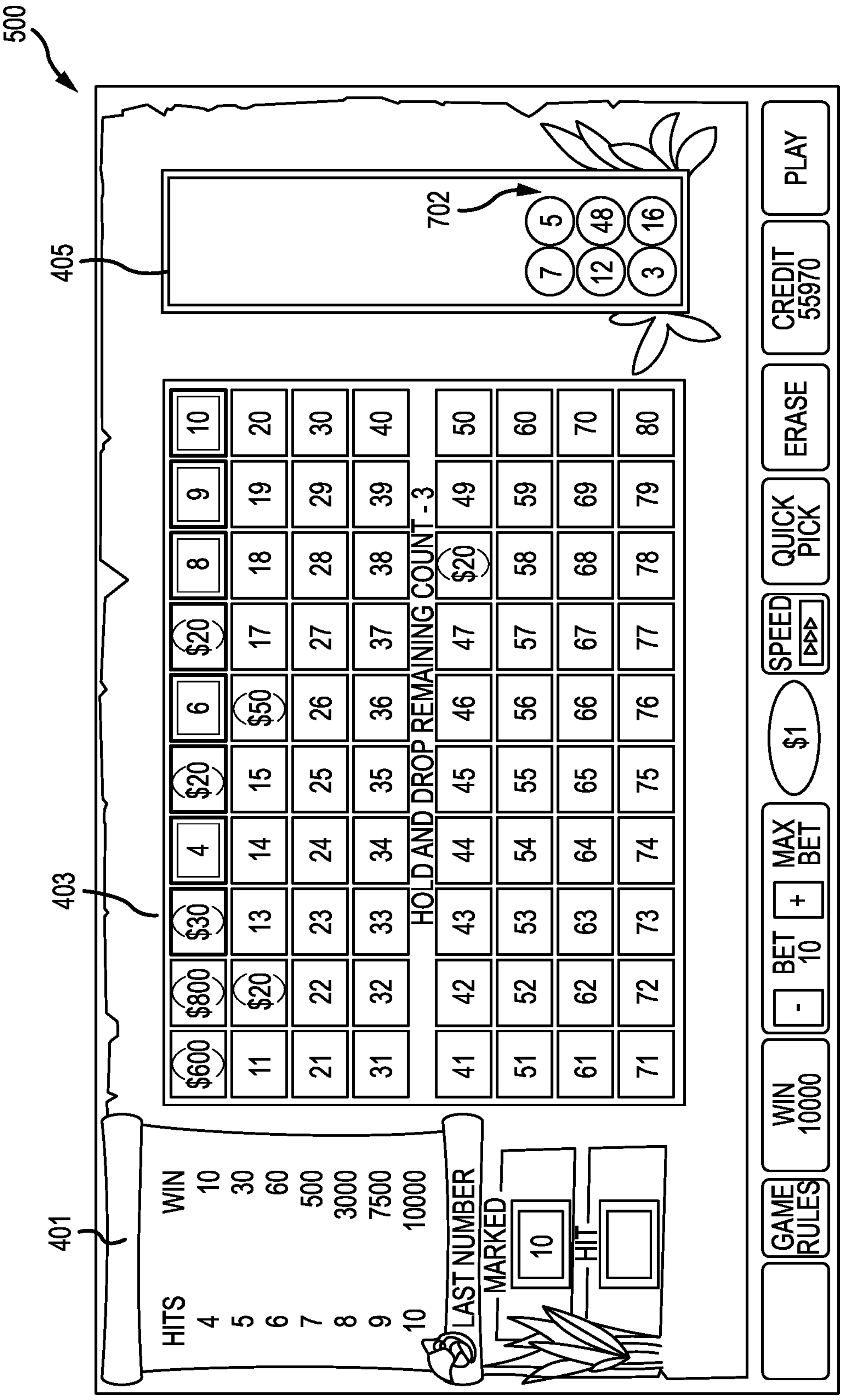
FIG. 7 is a third screenshot of an example feature keno game triggered from the base keno game shown in FIG. 4.

FIG. 7 is a third screenshot of feature keno game 500 showing a next ball selection in the sequence of re-drops. In FIG. 7, six new balls 702 are again randomly selected and dropped into ball selection area 405. Game controller 202 compares the numbers associated with each newly dropped (or re-dropped) ball within ball selection area 405 to the numbers associated with each player selected spot.

If there are any matches, these are marked on keno card 403, and the number of re-drops remaining is either incremented or decremented, as described above. In the example of FIG. 7, there are three matches between the balls dropped into ball selection area and player selected spots on keno card 403 (namely, balls numbering "3," "5," and "7" are selected, and these match player selected spots "3," "5," and "7." As a result, the number of re-drops is incremented to the starting value (of three re-drops), and feature game 500 continues. Likewise, each matched spot ("3," "5," and "7") may be converted to a randomly selected cash, credit, or prize value, and the value may be displayed over or within the matched spot on keno card 403.

At the conclusion of feature keno game 500 (e.g., after the player has exhausted all re-drops or matched all of his or her selected spots), game controller 202 may aggregate the cash, credit, or prize values displayed over each matched player selected spot to calculate a feature game award. In addition (or alternatively), game controller may compare the number of matched player selected spots to paytable 401 to determine a feature game award.

In the example of FIG. 7, game controller 202 may provide, for instance, a feature game award in the amount of 30 credits (corresponding to five matches). This credit award may be added to the cash or credit award totaled from the cash or credit values displayed over each matched spot or as a standalone award. Likewise, the cash or credit award may be provided in conjunction with the feature game award from paytable 401 or as a standalone award. In various embodiments, feature keno game 500 may also conclude when all of the player spots are matched prior to the number of re-drops being exhausted. The feature keno game 500 may provide a special award for matching all player spots, such as a progressive, or a jackpot prize.

Gameplay may also return to base keno game 400 at the conclusion of feature keno game 500, whereupon the player may select one or more new spots from keno card 403, place one or more additional wagers, and the like. If the player would rather terminate gameplay, he or she may also select a cashout option, which may provide the player's tallied game awards (e.g., credits) to the player in the form of a cash payout, a printed ticket, or credits or cash value allocated to a player tracking account or stored value instrument of the player.

Figure 8A:
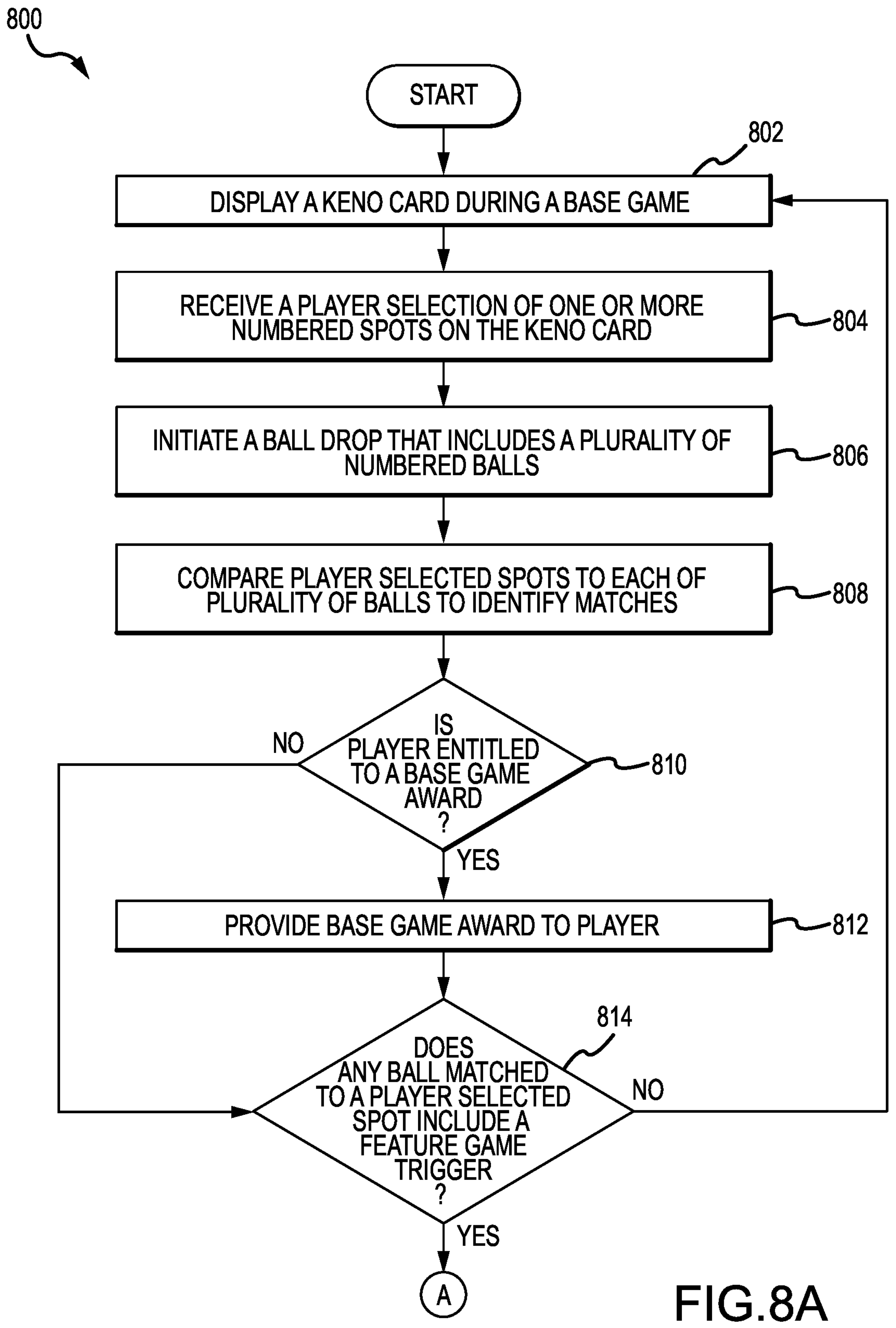
FIGS. 8A and 8B show segments of a flowchart illustrating a process of the example base and keno games described and shown in reference to FIG. 4-FIG. 7.
Figure 8B:
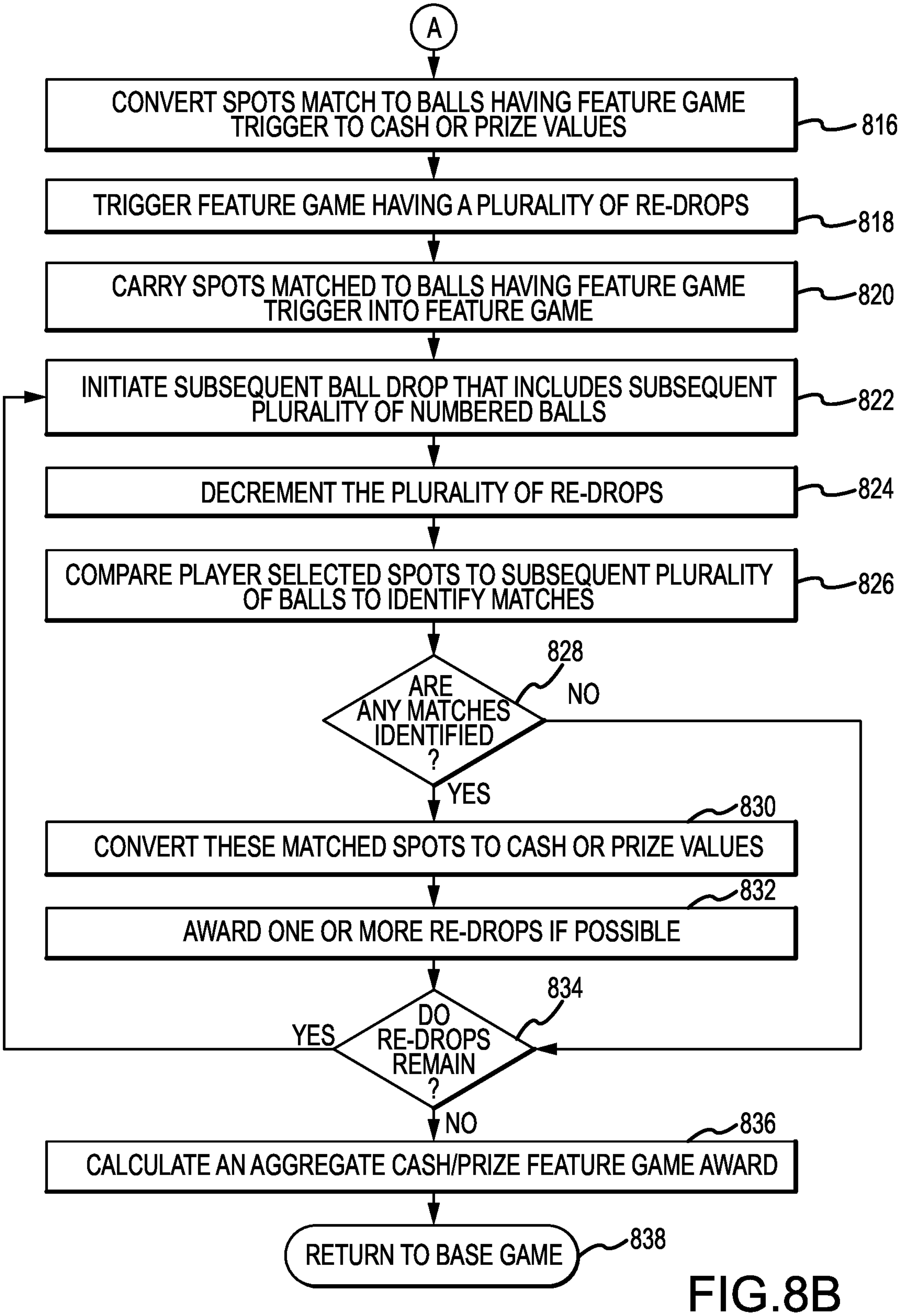

FIGS. 8A-8B show a flowchart illustrating a process 800 of the example base keno game 400 and feature keno game 500 described and shown in reference to FIG. 3-FIG. 7. Accordingly, in at least some embodiments, and as described herein, a processor (e.g., game controller 202 or processor 204 thereof, a backend or server processor, or another suitable computing device) may initiate base keno game 400 and display a keno card 403 during base keno game 400 (step 802).

As described above, in at least some embodiments, base keno game 400 and feature keno game 500 are shown on a display of an EGM 104A-104X, such as primary game display 240. However, keno games 400 and 500 may also be provided to any other EUD, such as, for example, any suitable tablet or personal computing device of the player, any smartphone of the player, and the like. In these embodiments, a server (e.g., any of servers 106-114 and/or another mobile computing server) may provide games 400 and 500 to the player's EUD, and/or a processor of the player's EUD may also facilitate and process at least some aspects of gameplay. Process 800 is described herein as being performed by game controller 202. However, it will be appreciated that any of the processing and computing devices enumerated above may also be used in the implementation of process 800.

As described above, during base keno game 400, a paytable 401 appears on the left hand side of a display area, a keno card 403 is shown in a center portion, and a ball selection area 405 is shown on a right side of the display area. During gameplay, game controller 202 may receive a player selection (e.g., via player tracking interface 232, button deck 120, and/or any other suitable player interface device) of one or more numbered spots keno card 403 (step 804). In the example shown at FIG. 4, a player selects numbers 1-10 on keno card 403.

In response to receiving the player selection, game controller 202 may initiate a ball selection, as described herein, which may include twenty balls 407 (step 806). However, it will be appreciated that any suitable number of balls may be selected during the ball selection of base keno game 400 (e.g., greater or fewer than twenty). Balls 407 may be randomly selected, such as based upon a random number received by game controller 202 from RNG 212. In the example of FIG. 4, balls numbering one through twenty are selected during the ball selection.

Game controller 202 may, in addition, compare the player selected spots (e.g., in the example of FIG. 4, player selected spots 1-10) to each of the plurality of balls included in the ball selection to identify matches therebetween (step 808). In this example, balls numbered 1-20 are selected during the ball selection, and the player selects spots 1-10. Accordingly, the player selected spots, in the example shown at FIG. 4, have all been matched with the selected balls.

Game controller 202 may determine a base game award amount by comparing the number of matches between the player selected spots and the selected balls to paytable 401 (step 810). The award may be provided to the player, such as by adding a credit or cash value of the award to the player's credit balance (step 812). Here, ten matches would result in a maximum award of 10,000 credits, and this value would be added to the player's credit balance.

If a threshold number of player selected spots has not been matched during the ball selection, or following addition of the base game award to the player's credit balance (i.e., if the player achieved a sufficient number of matches, as described above), game controller 202 may determine whether any ball matched to a player selected spot includes a feature game trigger (step 814). As described herein, in at least some embodiments, a feature game trigger may be specified by ball color. For instance, balls 407 that do not include the feature game trigger may be a first color (e.g., gray or blue), and balls that do include the feature game trigger may be a second color, such as gold. In the example embodiment, game controller 202 may therefore determine whether any gold balls are included in the plurality of balls 407. For example, feature keno game 500 may be triggered in response to matching the threshold number of spots to gold balls, e.g., three spots.

In response to determining that at least a threshold number of player selected spots has not matched with balls including the feature game trigger, game controller 202 may display a new keno card 403 and conduct a new ball selection (step 802). On the other hand, if a threshold number of player selected spots (e.g., one spot, two spots, etc.) match numbers provided on gold colored balls, game controller 202 may, in at least some embodiments, convert matched spots on keno card 403 to cash, credit, or other prize values (step 816). For instance, as shown in FIG. 4, spots 1 and 2 are matched to gold balls, whereupon spot 1 is converted to a cash value of $600, and spot 2 is converted to a cash value of $800.

Feature keno game 500 may be triggered in response to matching the threshold number of spots to gold balls, where, as described above, the player is awarded an initial number of re-drops or rounds (e.g., three re-drops) for use during the feature keno game 500 (step 818). Each re-drop is a round of play of the feature keno game. Following initiation of feature keno game 500, game controller may carry any spots matched to gold balls during base keno game 400 as matches (or converted cash values) into feature keno game 500 (step 820). For example, spots 1 and 2, which were converted to cash values in the base keno game 400, may be retained or carried into feature keno game 500, as shown in FIG. 5. In some embodiments, all of the player's matched spots may be carried into feature keno game 500 from base keno game 400 (e.g., even those not matched to gold balls). During the feature keno game 500, the match spots not converted to cash values may be covered or matched with gold balls during successive re-drops, as described herein.

In the example embodiment, game controller 202 may initiate a first re-drop of the initial number of re-drops, whereupon a new ball selection may be performed (step 822). As described above, the subsequent ball selection may include fewer balls (e.g., six balls 504) than were included in the ball selection of base keno game 400. However, in at least some embodiments, all of the balls selected during each re-drop may be gold colored (that is, all balls selected during feature keno game 500 may include the feature game trigger). Further, in response to the first re-drop, a counter storing a current re-drop value may be decremented (step 824). For instance, if the initial number of re-drops is three, after the first re-drop, the counter may be decremented to a value of two re-drops remaining. The number of re-drops remaining may be shown at an intermediate banner location (or another suitable location) on keno card 401. In various embodiments, the initial number of re-drops is predetermined, randomly determined, determined based on wager amount, such as ante bet, based on the quantity of spots matched prior to the trigger of the feature game, based on the quantity of spots matched by trigger balls to selected spots, etc.

Game controller 202 may, in addition, compare each of the player selected spots (e.g., spots 1-10 in the example used herein) to the subsequent plurality of balls 504 of the first re-drop to identify matches (step 826). If matches are identified, each spot corresponding to a match may be converted to a cash, credit, or prize value, as described herein (e.g., randomly and/or based upon another weighting or probability, including, in some embodiments, at least partially based upon a value of a player wager, where larger wagers may result in higher probabilities of conversions to larger cash or credit values) (step 830). In certain embodiments, the values may be selected from a predetermined group of values. For larger bet amounts, a different group of values may be used. Further, to select one value from the group of values, a weighted table may be used, where values may be weighed differently based on the amount of wager. In other embodiments, another factor, such as quantity of trigger balls matching player selected spots may be used instead of, or in combination with, wager amount. In certain embodiments, some cash values may not be fixed, i.e., they may be mapped to a progressive prize which increases over time. Hence, instead of showing the current cash value, the spot may show the name of the progressive prize, such as mini, minor, major, etc.

Game controller 202 may also award one or more re-drops to the player in response to the occurrence of a threshold number of matches during feature keno game 500 (step 832). For example, in at least one embodiment, game controller 202 may increment the number of re-drops to the initial value (e.g., three), in response to the occurrence of a threshold number of matches. For instance, if during any re-drop, an additional match occurs, the number of remaining re-drops may be reset to the initial number of re-drops. In certain embodiments, instead of resetting to the initial number of re-drops, a second quantity of re-drops may be added. The quantity may be pre-determined, or randomly determined. Gameplay may continue in this fashion until the player exhausts all of his or her re-drops or until all of the player selected spots are matched by balls dropped during base keno game 400 and feature keno game 500. However, if the player has matched all selected spots, no additional re-drops may be awarded, even if the player matches one or more spots to gold balls during a previous re-drop.

In the example embodiment, game controller 202 may determine whether any re-drops remain, such as, for example, following determination that no player selected spots match balls from a re-drop selection (e.g., balls 504, 602, and/or 702), or following awarding of re-drops after identification of one or more matches (step 834). If re-drops remain, game controller 202 may return the process flow to step 822 (i.e., initiating a subsequent ball selection). On the other hand, if no re-drops remain, game controller may calculate a feature game award, such as by aggregating or summing the values of the cash or credit prizes displayed in each of the spots converted to cash or credit prizes on keno card 403 (step 836). The aggregated feature game award may be added to the credit balance of the player, and gameplay may return to base keno game 400 (e.g., step 838).

In certain embodiments, the quantity of balls drawn for each re-drop of the feature game may be the same. In certain embodiments, the quantity may be different for each re-drop. In yet other embodiments, each re-drop may have a quantity assigned to it. The quantity may decrease as more re-drops are awarded to the player.

In certain embodiments, the player selected spots may be the same between the base game round that triggered the feature game, and all the re-drops of the feature game. In other embodiments, the player selected spots can be changed. In some embodiments, the quantity of player selected spots may differ from the play of the base game to the play of the feature game and further differ for one or more re-drops.

In certain embodiments, the threshold number of matches between the ball numbers and player selected spots that causes an additional number of re-drops to be provided, or the remaining re-drops to be reset, may vary and may not be fixed for each re-drop. In certain embodiments, no additional re-drop may be provided for an additional match. In certain embodiments, an additional quantity of re-drops may be provided at the end of the feature game with the initial quantity of re-drops. The additional quantity of re-drops may be predetermined, randomly determined, or player selectable.

In certain embodiments, the feature game may include additional instances of the keno card 403. The additional quantity may be predetermined, randomly determined, or player selected. Additionally, the additional quantity may be based on a trigger condition, a wager amount, or some other qualification criteria. For example, if a trigger quantity of matches occur in the play of the base game, two keno cards 403 may be displayed for the play of the feature game. Play of each keno card may proceed independently. Player selections for each keno card may be the same, or can vary, and new selections can be determined as described herein.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:

at least one memory storing instructions, a weighted table, and a random number generator (RNG); and at least one processor in communication with the at least one memory, wherein the instructions, when executed by the at least one processor, cause the at least one processor to:

cause display of a plurality of display positions comprising a plurality of respective symbols;

select a number of the plurality of display positions for use in an electronic game, the number of the plurality of display positions comprising selected display positions;

determine which of the number of the plurality of display positions comprises a winning display position for the electronic game;

determine, based on a first RNG output, a subset of the plurality of display positions that comprise feature display positions;

determine, based on a second RNG output and the weighted table, a respective credit value for at least one selected display position comprising a feature display position;

in the at least one selected display position comprising a feature display position, convert display from a respective symbol of the plurality of respective symbols to the respective credit value, wherein upon conversion, the at least one selected display position comprises at least one converted display position; and present at least one additional play of the electronic game based on the at least one selected display position comprising the feature display position.

2. The electronic gaming system of claim 1, wherein the instructions further cause the at least one processor to:

select a plurality of balls for the electronic game;

compare the plurality of balls to the number of the plurality of respective symbols; and determine an outcome for the electronic game based on the comparison.

3. The electronic gaming system of claim 1, wherein the instructions further cause the at least one processor to:

determine whether a predetermined quantity of selected display positions comprise feature display positions; and based on determining that the predetermined quantity of selected display positions comprise feature display positions, cause initiation of a bonus game comprising a plurality of plays, wherein the at least one converted display position remains converted during the plurality of plays.

4. The electronic gaming system of claim 3, wherein the instructions further cause the at least one processor to determine an outcome for the bonus game based on the respective credit value.

5. The electronic gaming system of claim 3, wherein the instructions further cause the at least one processor to, during at least one play of the plurality of plays of the bonus game:

determine a second subset of the plurality of display positions that comprise second feature display positions;

determine a second respective credit value for at least one selected display position comprising a second feature display position; and in the at least one selected display position comprising a second feature display position, convert display from a second respective symbol of the plurality of respective symbols to the second respective credit value.

6. The electronic gaming system of claim 5, wherein the instructions further cause the at least one processor to present at least one additional play of the bonus game based on the at least one selected display position comprising a second feature display position.

7. The electronic gaming system of claim 1, wherein the instructions further cause the at least one processor to:

receive an input amount for the electronic game; and determine, based on the second RNG output, the weighted table, and the input amount, the credit value for the at least one selected display position comprising a feature display position, wherein the weighted table comprises a plurality of credit values weighted based on different possible input amount.

8. The electronic gaming system of claim 1, wherein the instructions further cause the at least one processor to select the number of the plurality of display positions for use in the electronic game based on an input received at a player input interface.

9. A method of electronic gaming implemented by at least one processor in communication with at least one memory, the method comprising:

causing display of a plurality of display positions comprising a plurality of respective symbols on at least one display device;

selecting a number of the plurality of display positions for use in an electronic game, the number of the plurality of display positions comprising selected display positions;

selecting a plurality of balls for the electronic game;

comparing the plurality of balls to the number of the plurality of respective symbols to determine which of the number of the plurality of display positions comprises a winning display position for the electronic game;

determining an outcome for the electronic game based on the comparison; and in accordance with the outcome:

determining, based on a first RNG output, a subset of the plurality of display positions that comprise feature display positions;

determining, based on a second RNG output and a weighted table, a respective credit value for at least one selected display position comprising a feature display position; and in the at least one selected display position comprising a feature display position, converting display from a respective symbol of the plurality of respective symbols to the respective credit value on the at least one display device, wherein upon conversion, the at least one selected display position comprises at least one converted display position.

10. The method of claim 9, further comprising:

determining whether a predetermined quantity of selected display positions comprise feature display positions; and based on determining that the predetermined quantity of selected display positions comprise feature display positions, causing initiation of a bonus game comprising a plurality of plays, wherein the at least one converted display position remains converted during the plurality of plays.

11. The method of claim 10, further comprising determining an outcome for the bonus game based on the respective credit value.

12. The method of claim 10, further comprising, during at least one play of the plurality of plays of the bonus game:

determining a second subset of the plurality of display positions that comprise second feature display positions;

determining a second respective credit value for at least one selected display position comprising a second feature display position; and in the at least one selected display position comprising a second feature display position, converting display from a second respective symbol of the plurality of respective symbols to the second respective credit value.

13. The method of claim 12, further comprising presenting at least one additional play of the bonus game based on the at least one selected display position comprising a second feature display position.

14. The method of claim 9, further comprising:

receiving an input amount for the electronic game; and determining, based on the second RNG output, the weighted table, and the input amount, the credit value for the at least one selected display position comprising a feature display position, wherein the weighted table comprises a plurality of credit values weighted based on different possible input amounts.

15. The method of claim 9, further comprising selecting the number of the plurality of display positions for use in the electronic game based on an input received at a player input interface.

16. At least one non-transitory computer-readable storage medium with instructions stored thereon that, in response to execution by at least one processor, cause the at least one processor to:

identify a number of a plurality of display positions for use in an electronic game, the number of the plurality of display positions comprising selected display positions, wherein the plurality of display positions comprise a plurality of respective symbols;

determine which of the number of the plurality of display positions comprises a winning display position for the electronic game;

determine, based on a first random number generator (RNG) output, a subset of the plurality of display positions that comprise feature display positions;

determine, based on a second RNG output and a weighted table, a respective credit value for at least one selected display position comprising a feature display position;

in the at least one selected display position comprising a feature display position, cause a respective symbol of the plurality of respective symbols to convert to the respective credit value, wherein upon conversion, the at least one selected display position comprises at least one converted display position;

determine whether a predetermined quantity of selected display positions comprise feature display positions; and based on determining that the predetermined quantity of selected display positions comprise feature display positions, cause initiation of a bonus game comprising a plurality of plays, wherein the at least one converted display position remains converted during the plurality of plays.

17. The at least one non-transitory computer-readable storage medium of claim 16, wherein the instructions further cause the at least one processor to:

select a plurality of balls for the electronic game;

compare the plurality of balls to the number of the plurality of respective symbols; and determine an outcome for the electronic game based on the comparison.

18. The at least one non-transitory computer-readable storage medium of claim 16, wherein the instructions further cause the at least one processor to, during at least one play of the plurality of plays of the bonus game:

determine a second subset of the plurality of display positions that comprise second feature display positions;

determine a second respective credit value for at least one selected display position comprising a second feature display position; and in the at least one selected display position comprising a second feature display position, cause a second respective symbol of the plurality of respective symbols to convert to the second respective credit value.

* * * * *